United States Patent Office.

DANIEL R. PRINDLE, OF EAST BETHANY, NEW YORK.

Letters Patent No. 63,298, dated March 26, 1867.

IMPROVED COMPOSITION FOR DESTROYING INSECTS.

The Schedule referred to in these Letters Patent and making part of the same.

TO ALL WHOM IT MAY CONCERN:

Be it known that I, DANIEL R. PRINDLE, of East Bethany, in the county of Genesee, and State of New York, have invented an Improved Composition for Destroying Caterpillars and other insects; and I do hereby declare that the following is a full and exact description of the method of preparing and applying the same.

The substances which I use in this composition are coal tar and petroleum, naphtha, or other of the more volatile products of petroleum. Both of these substances, coal tar and petroleum, contain essential oils or other principles which are deadly to insects. Especially is coal-tar, which contains much creosote, destructive to them; and the two united appear to have an enhanced effect, while neither the coal tar nor petroleum can be practically applied alone. The coal tar is not sufficiently liquid, and the petroleum is too fluid and volatile to be employed. What is required is a composition which has about the consistency of paint, so that it may be applied with a brush, and it must not be ropy or sticky, on the one hand, nor liable to run down and besmear the operator, or on the other hand. The required consistency I find can be produced by mixing the petroleum with the coal tar in such proportions as may be required, which vary with the temperature of the atmosphere at the time, and can only be determined when mixing the ingredients.

The principal use of the composition is to destroy the orchard caterpillars. For applying the composition I usually prepare a wisp or brush of fine stiff hay, say two inches in diameter, attached to a handle or pole of the desired length, and projecting three or four inches therefrom. This brush is dipped in the composition and then applied to the nests of the caterpillars, and twisted around in them so as to draw them away. The caterpillars in the nest and those straying around it should be painted with the composition, which is sure death to them. And not only is the composition poisonous to them, but it adheres to them and mats down and besmears their hairs so that they could never extricate themselves if alive.

What I claim as my invention, and desire to secure by Letters Patent, is—

The composition of coal tar and petroleum, in the manner and for the purpose herein specified.

The above specification of my improved composition for destroying insects signed by me this 26th day of December, 1866.

D. R. PRINDLE.

Witnesses:
   J. S. BROWN,
   E. J. BROWN.